United States Patent [19]
Adachi

[11] Patent Number: 5,718,405
[45] Date of Patent: Feb. 17, 1998

[54] CUP HOLDER

[75] Inventor: Tomoyuki Adachi, Wako, Japan

[73] Assignee: Honda Giken Kogyo Kabushiki Kaisha, Tokyo, Japan

[21] Appl. No.: 588,517

[22] Filed: Jan. 18, 1996

[30]     Foreign Application Priority Data

Feb. 1, 1995  [JP]  Japan ................... 7-015393

[51] Int. Cl.⁶ ................................................. A47K 1/08
[52] U.S. Cl. ............................... 248/311.2; 224/926
[58] Field of Search ........................ 248/311.2, 311.3; 297/188.19, 188.14; 224/926, 553, 567

[56]             References Cited

U.S. PATENT DOCUMENTS 4,919,381  4/1990  Buist ............................ 248/311.2
  5,170,980  12/1992 Burrows et al. ................ 248/311.2
  5,503,297  4/1996  Frankel ......................... 248/311.2
  5,520,313  5/1996  Toshihide ....................... 248/311.2

FOREIGN PATENT DOCUMENTS 54-8510   4/1979  Japan.
  5-25958   9/1988  Japan.

*Primary Examiner*—Ramon O. Ramirez
*Assistant Examiner*—Willie Berry, Jr.
*Attorney, Agent, or Firm*—Armstrong, Westerman Hattori, McLeland & Naughton

[57]            ABSTRACT

A cup holder for holding beverage containers in the passenger's compartment of a motor vehicle has a holder body mounted in the passenger's compartment and having a pair of cavities for holding the beverage containers, a cover for covering the cavities, a pair of guide mechanisms for selectively opening and closing the cover, and a retainer assembly mounted on a flange of the holder body. The retainer assembly has a pair of retainers for retaining the beverage containers held in the cavities, and a projection integrally formed with the retainers for abutting against the cover to stop the cover.

6 Claims, 5 Drawing Sheets

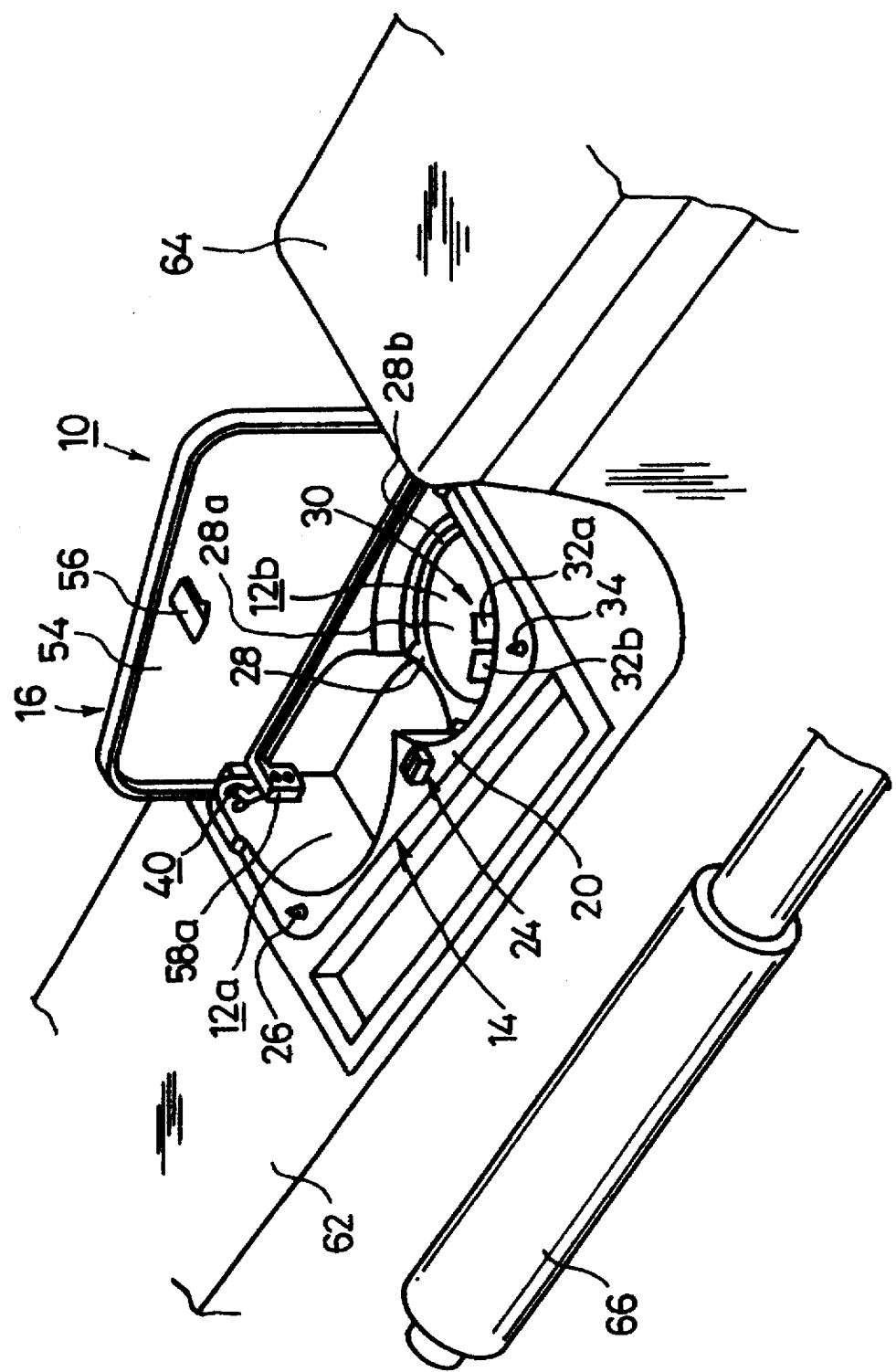

2

CUP HOLDER

BACKGROUND OF THE INVENTION

1. Field of the Invention

The present invention relates to a cup holder which can be placed in a passenger's compartment of a motor vehicle for holding a beverage can or the like.

2. Description of the Related Art

There have heretofore been proposed a variety of cup holders of use in passenger's compartments of motor vehicles such as automobiles.

For example, a cup holder disclosed in Japanese utility model publication No. 54-8510 includes an annular holder member mounted on an attachment plate for holding an upper circumferential wall of a cup, the annular holder member having a resilient retainer projecting from an inner circumferential surface thereof. The resilient retainer can elastically be flexed to different degrees by cups of different diameters, so that the cup holder can hold differently sized cups of different outside diameters.

Japanese utility model publication No. 5-25958 reveals another cup holder which comprises a holder plate having a plurality of spaced cup reception holes of different diameters. Depending on the size of a cup to be held by the cup holder, the user selects one of the cup reception holes, and positions the holder plate again in a frame so as to expose the selected cup reception hole outwardly. The disclosed cup holder can thus hold various cups of different outside diameters.

With the conventional structures, the cup holder has a recess for retaining a cup, a cover for closing the recess, a lock mechanism for holding the cover on the holder, and a resilient stopper disposed between abutting portions of the holder and the cover. The resilient stopper is effective in preventing the lock mechanism from moving an excessive stroke for thereby protecting the cover against damage due to abutting engagement with the holder.

According to the conventional arrangements, the member, e.g., the resilient retainer, for holding various cups of different outside diameters, and the stopper for protecting the cover are formed as different members. Consequently, the conventional cup holders are expensive to manufacture and assembled cumbersomely in a large number of steps.

SUMMARY OF THE INVENTION

It is a general object of the present invention to provide a cup holder which includes retainers for holding a beverage container and a projection for stopping a cover, the retainers and the projection being integrally formed with each other, so that the cup holder is made up of a reduced number of parts and hence can be manufactured relatively inexpensively.

A major object of the present invention is to provide a cup holder which includes retainers for holding a beverage container, the retainers being fitted in respective slots defined in a flange, so that the cup holder can be assembled in a reduced number of steps and hence can be manufactured relatively inexpensively.

The above and other objects, features, and advantages of the present invention will become apparent from the following description when taken in conjunction with the accompanying drawings which illustrate a preferred embodiment of the present invention by way of example.

DESCRIPTION OF THE DRAWINGS

FIG. 5 is a perspective view showing the manner in which the cup holder shown in FIG. 1 has been installed in a passenger's compartment of a motor vehicle.

DETAILED DESCRIPTION OF THE PREFERRED EMBODIMENT

Figure 1:
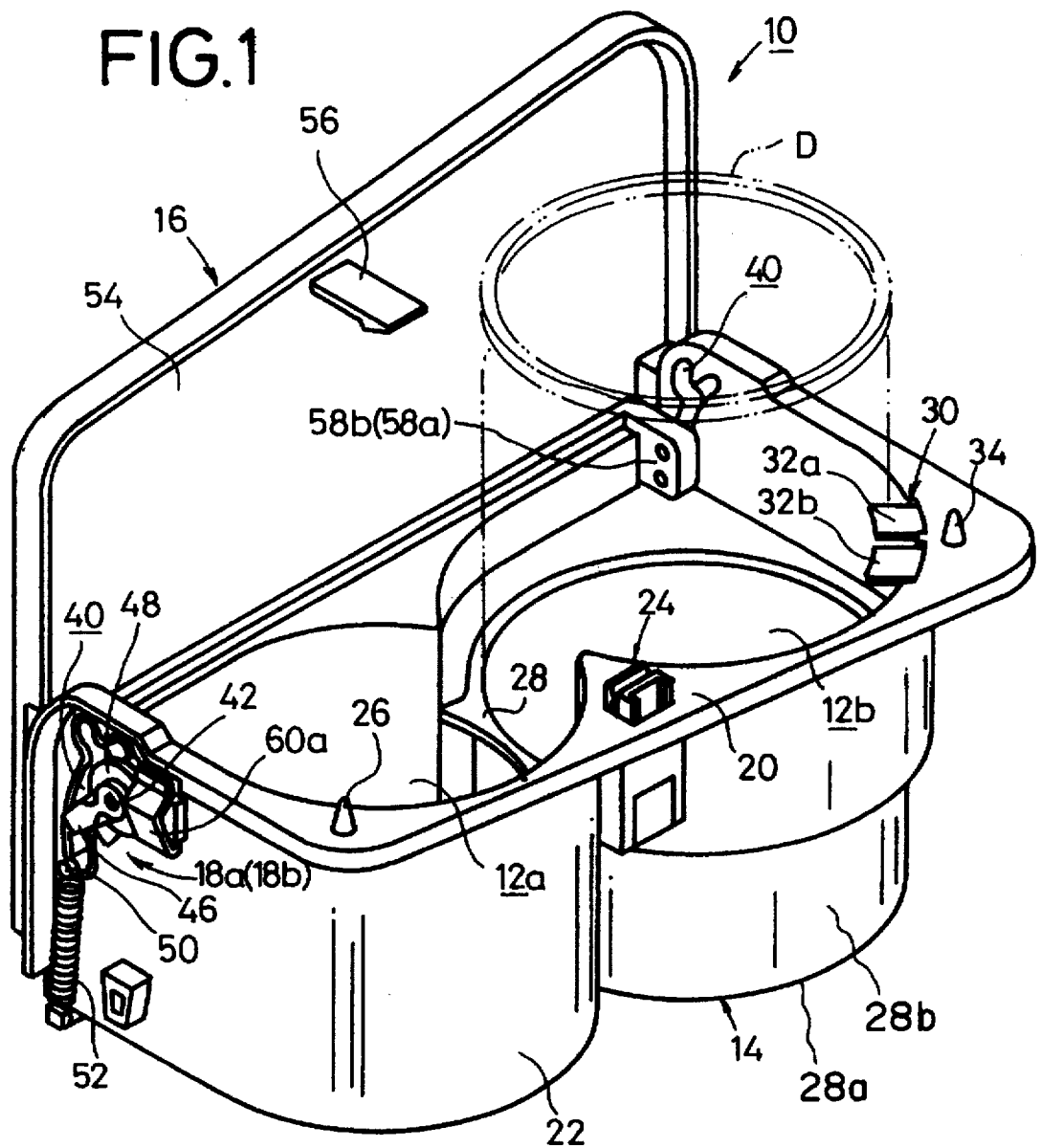
FIG. 1 is a perspective view of a cup holder according to an embodiment of the present invention.

As shown in FIG. 1, a cup holder, generally designated by the reference numeral 10, according to a preferred embodiment of the present invention is preferably used in a passenger's compartment of a motor vehicle such as an automobile. The cup holder 10 is basically in the form of a box, and comprises a holder body 14 having a pair of substantially cylindrical cavities 12a, 12b each having a diameter corresponding to the diameter of a beverage container D such as a juice can or the like, an elongate cover 16 openably and closably attached to the holder body 14 for covering the cavities 12a, 12b, and a pair of guide mechanisms (opening and closing mechanisms) 18a, 18b mounted respectively on longitudinally spaced side walls of the holder body 14, for selectively opening and closing the cover 16 with respect to the holder body 14.

Figure 2:
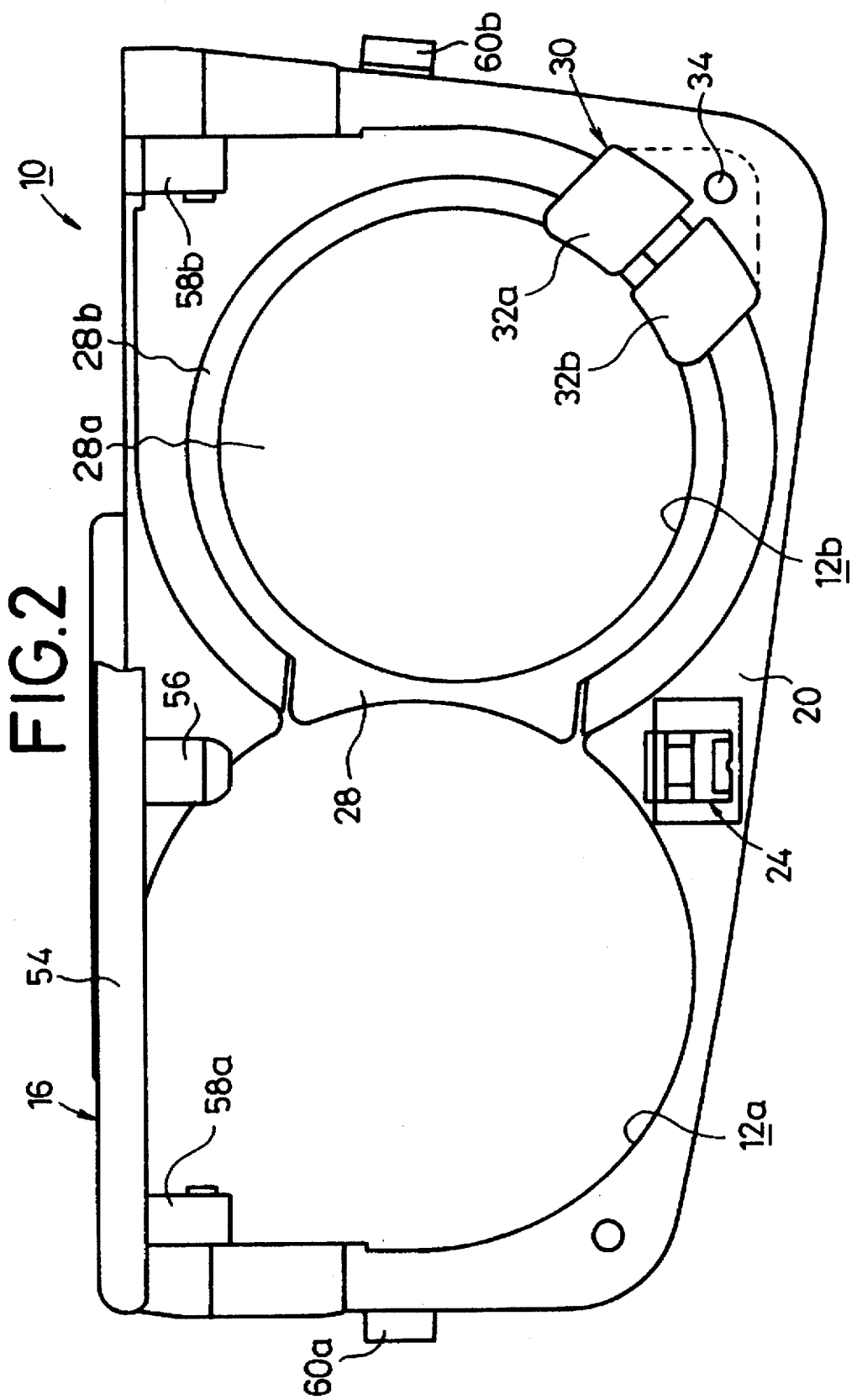
FIG. 2 is a plan view of the cup holder shown in FIG. 1.

The holder body 14 comprises a horizontally elongate casing 22 in which the cavities 12a, 12b are defined parallel to each other vertically and are open upwardly. The casing 22 has a horizontal flange 20 extending along and projecting outwardly from an upper edge thereof around the upper open ends of the cavities 12a, 12b. As shown in FIG. 2, the casing 22 has a width, transverse to the longitudinal axis thereof, progressively increasing from one longitudinal end to the other longitudinal end thereof. The holder body 14 also has a locking member 24 positioned substantially centrally on the flange 20 between the cavities 12a, 12b. The flange 20 supports an upwardly pointed projection 26 of elastic material disposed on the narrower longitudinal end of the casing 22 near the cavity 12a and spaced from the locking member 24. The projection 26 projects upwardly of the flange 20 for abutting engagement with a lower surface of the cover 16. Therefore, the projection 26 serves as a stopper for stopping the cover 16 upon its closing movement. A cup receiver 28, which has a substantially circular bottom plate 28a and an annular outer circumferential strip 28b integral with the bottom plate, 28a is detachably mounted in the cavity 12b. While the cup receiver 28 is shown as being mounted in the cavity 12b, the cup receiver 28 can also be detachably mounted in the cavity 12a. When the cup receiver 28 is mounted in the cavity 12a or 12b, the cavity 12a or 12b can accommodate a substantially cylindrical beverage container D of smaller diameter therein. When the cup receiver 28 is detached from the cavity 12a or 12b, the cavity 12a or 12b can accommodate a substantially cylindrical beverage container of larger diameter therein. Of course, two cup receivers 28 may simultaneously be placed in the respective cavities 12a, 12b for holding respective beverage containers D of smaller diameter therein.

Figure 4:
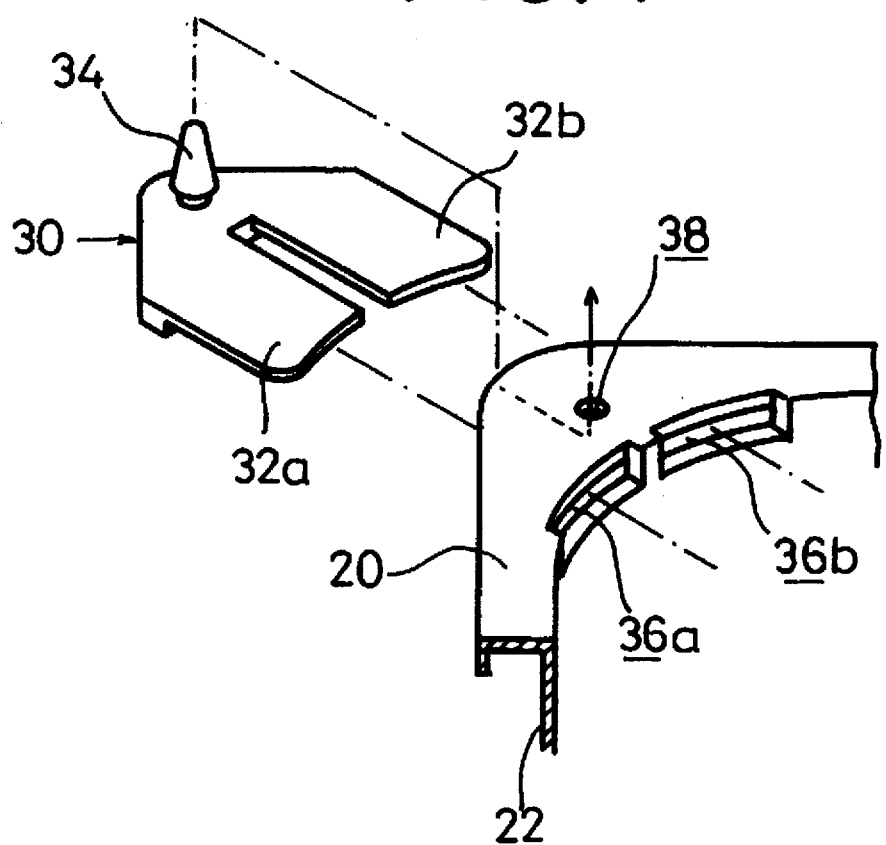
FIG. 4 is an exploded perspective view of retainers of the cup holder shown in FIG. 1.

A retainer assembly 30, which is made of an elastic material such as natural rubber, synthetic rubber, or the like, is mounted on the other wider longitudinal end of the flange 20 near the cavity 12b at a position spaced from the locking member 24. The retainer assembly 30 comprises a pair of flat retainers 32a, 32b spaced from each other by a central slit and having respective concavely curved tip ends projecting a predetermined distance radially inwardly into the cavity 12b. When a substantially cylindrical beverage container D is placed in the cavity 12b, the concavely curved tip ends of the retainers 32a, 32b press an outer circumferential surface of the beverage container D, thereby holding the beverage container D securely in the cavity 12b. The flange 20 supports another upwardly pointed projection 34 of elastic material disposed on the wider longitudinal end of the casing 22 near the cavity 12b and spaced from the locking member 24. The projection 34 projects upwardly of the flange 20 for abutting engagement with a lower surface of the cover 16. Therefore, the projection 34 serves as a stopper for stopping the cover 16 upon its closing movement. The retainers 32a, 32b and the projection 34 are integrally formed with each other as shown in FIG. 4. In FIG. 4, the retainers 32a, 32b are fitted respectively in a pair of horizontally elongate rectangular slots 36a, 36b defined in both the casing 22 and the flange 20 near the wider longitudinal end of the casing 22, and the projection 34 is fitted in a substantially circular hole 38 defined in the flange 20 near the wider longitudinal end of the casing 22. Therefore, the retainer assembly 30, which is composed of the retainers 32a, 32b and the projection 34, can easily be attached to the casing 22 simply by inserting the retainers 32a, 32b into the slots 36a, 36b and also inserting the projection 34 into the hole 38.

The projection 26 may also be integrally formed with a retainer assembly similar to the retainer assembly 30.

Figure 3:
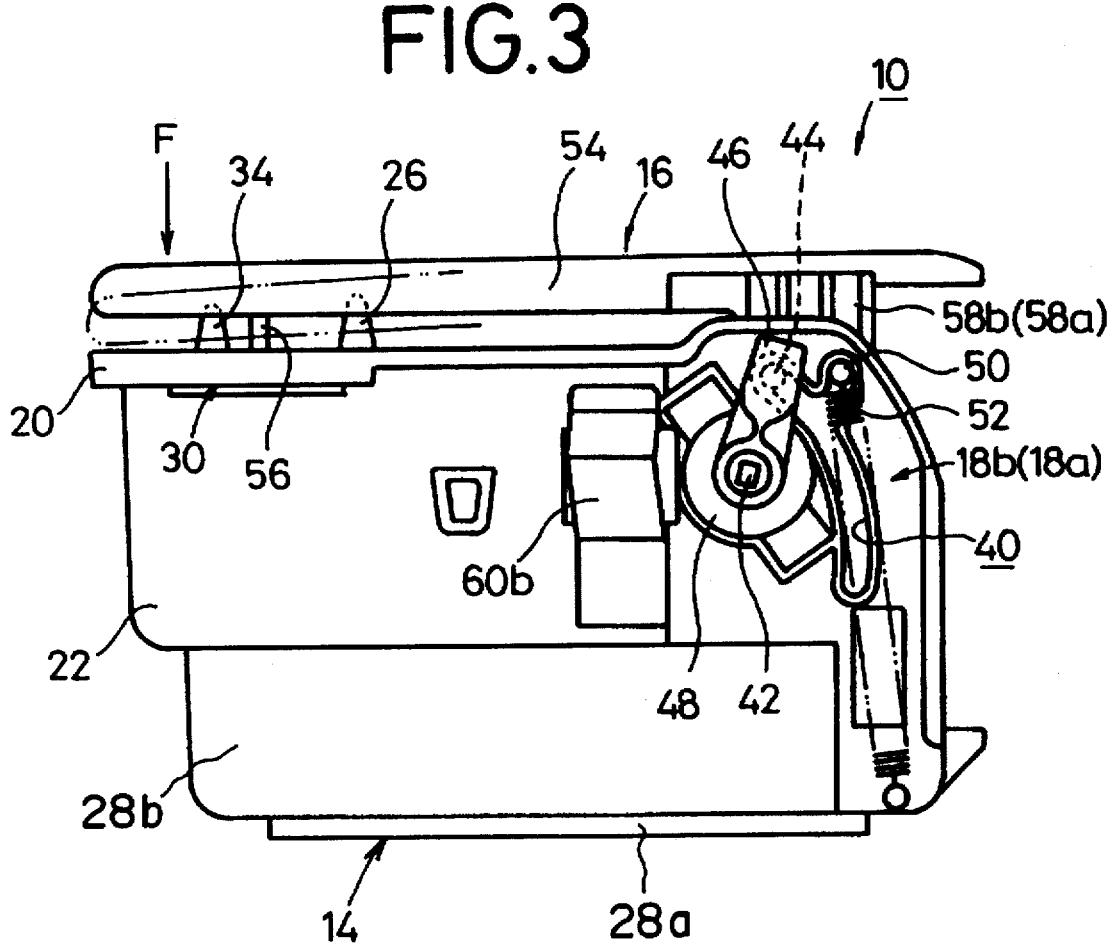
FIG. 3 is a side elevational view of the cup holder shown in FIG. 1.

As shown in FIGS. 1 and 3, the cup holder 10 has a pair of guide mechanisms 18a, 18b mounted on the respective longitudinal ends of the casing 22. Since the guide mechanisms 18a, 18b are essentially identical in shape to each other, their corresponding parts are denoted by corresponding reference characters, and only the guide mechanism 18a will be described in detail below.

The guide mechanism 18a comprises a curved guide groove 40 defined in an outer side wall of the casing 22 and extending downwardly, an arm 46 angularly movably supported at one end thereof on the outer side wall of the casing 22 by a pin 42 and coupled at the other end thereof to a guide pin 44 which is integrally formed with one end of the cover 16 and slidably movable in the guide groove 40, a ring 48 interposed between the arm 46 and the casing 22, and a spring 52 having one end engaging the casing 22 and the other end engaging a guide pin 50 which is integrally formed with the end of the cover 16 and slidably movable in the guide groove 40. When the cover 16 is opened or closed with respect to the holder body 14, the guide pins 44, 50 integral with the cover 16 slide along the guide groove 40, and the arm 46 coupled to the guide pin 44 is angularly displaced about the pin 42.

The cover 16 comprises a substantially flat cover plate 54 for engaging the projections or stoppers 26, 34, a hook 56 integrally projecting from a substantially central portion of the cover plate 54 for locking engagement with the locking member 24, and a pair of end blocks 58a, 58b mounted respectively on opposite longitudinal ends of the cover plate 54. The end blocks 58a, 58b support respective pairs of guide pins 44, 50 which have ends fitted in the end blocks 58a, 58b and project outwardly into the guide grooves 40 of the lock mechanisms 18a, 18b. As described above, the guide pin 50 in each pair is engaged by the spring 52, and the other guide pin 44 is coupled to the arm 46. The guide pins 44, 50 in each pair are slidable in and along the guide groove 40 in unison with the cover plate 54.

As shown in FIG. 2, a pair of bent leaf springs 60a, 60b is mounted on the respective longitudinal ends of the casing 22 for securing the cup holder 10 to a predetermined region in the passenger's compartment.

The cup holder 10 of the above structure operates as follows and offers the following advantages:

As shown in FIG. 5, the cup holder 10 is mounted by the leaf springs 60a, 60b in a hole in a panel 62 positioned between the driver's seat and the passenger's front seat in the passenger's compartment. The cup holder 10 as it is thus mounted in position is positioned between a gearshift lever (not shown) and a storage compartment 64, and a parking brake lever 66 is positioned closely to the cup holder 10. The cup holder 10 may not be positioned in the panel 62, but may be positioned in another desired location in the passenger's compartment.

The beverage container D will be placed into and held by the cup holder 10 as follows:

As shown in FIG. 3, while the cavities 12a, 12b in the casing 22 are being closed by the cover 16, the cover plate 54 is held in abutting engagement with the projections 26, 34, and the hook 56 is locked by the locking member 24. For opening the cover 16, the cover plate 54 is manually depressed to the two-dot-and-dash-line position in the direction indicated by the arrow F by the user such as the driver or a passenger. The hook 56 is now unlocked from the locking member 24, and displaced away from the locking member 24 under the resiliency of the projections 26, 34. Then, the cover plate 54 is angularly displaced through a certain angle about the pin 42 under the tension of the springs 52. At this time, the guide pins 44, 50 slide in and along the guide grooves 40 until the cover plate 54 is angularly moved to the open position shown in FIG. 1.

When the cup holder 10 is open, the user puts the beverage container D into the cavity 12b. The retainers 32a, 32b flex and elastically engage the outer circumferential surface of the beverage container D that is being pushed downwardly into the cavity 12b. The retainers 32a, 32b elastically press the beverage container D, retaining the beverage container D in the cavity 12b.

When the cup holder 10 is closed with the cover plate 54, the lower surface of the cover plate 54 abuts against the elastic projections 26, 34, which serve as stoppers to stop the cover plate 54 from damaging the flange 20. Therefore, the flange 20 is prevented from being damaged by the cover plate 54, and the cover plate 54 itself is also protected from damage. In addition, the projections 26, 34 are also effective in preventing the hook 56 from being pushed an excessive stroke into the locking member 24, so that the hook 56 can reliably be locked by the locking member 24.

As described above, the retainers 32a, 32b for retaining the beverage container D and the projection 34 for stopping the cover plate 54 are integrally formed with each other. Therefore, the cup holder 10 is made up of a reduced number of parts, can be assembled in a reduced number of steps, and hence can be manufactured relatively inexpensively.

Although a certain preferred embodiment of the present invention has been shown and described in detail, it should be understood that various changes and modifications may be made therein without departing from the scope of the appended claims.

What is claimed is:

1. A cup holder comprising:
   a holder body adapted to be mounted in a passenger's compartment of a motor vehicle and having at least one cavity for holding beverage containers of different diameters;
   a cover openably and closably attached to said holder body for covering said at least one cavity;

a pair of opening and closing mechanisms for selectively opening and closing said cover; and a retainer assembly mounted on a flange of said holder body, said retainer assembly having a pair of retainers for retaining a beverage container held in said at least one cavity, and a projection, wherein said projection and said pair of retainers are formed together as an integral body, said projection abutting against said cover, when said cover is closed, to stop said cover.

2. The cup holder according to claim 1, wherein said retainer assembly is made of an elastic material, said flange having a pair of slots and a hole defined therein, said retainers being fitted in said slots, respectively, and projecting a predetermined distance into said at least one cavity, said projection being fitted in said hole and projecting upwardly of said flange.

3. The cup holder according to claim 1, wherein said holder body comprises a casing, and said opening and closing mechanisms are essentially identical in shape to each other and mounted respectively on longitudinally spaced side walls of said casing, each of said opening and closing mechanisms comprising a curved guide groove defined in an outer side wall of said casing, an arm angularly movably supported at a first end thereof on an outer side wall of said casing by a pin and coupled at a second opposed end thereof to guide pins which are integrally formed with one end of said cover and slidably movable in said guide groove, a ring interposed between said arm and said casing, and a spring having a first end engaging said casing and a second end engaging said guide pin.

4. The cup holder according to claim 1, further comprising a cup receiver detachably mounted in said at least one cavity, said cup receiver having a substantially circular bottom plate and an annular outer circumferential strip integral with said bottom plate.

5. The cup holder according to claim 1, wherein said holder body is of an elongate shape which has a width and first and second longitudinal ends, transverse to a longitudinal axis thereof, progressively increasing from said first longitudinal end to said second longitudinal end thereof.

6. The cup holder according to claim 1, wherein said holder body is of an elongate shape, further comprising a pair of leaf springs mounted on respective longitudinal ends of said holder body for securely mounting said cup holder in a hole in a panel in said passenger's compartment.

* * * * *